US007620563B2

(12) United States Patent
Tornaquindici

(10) Patent No.: US 7,620,563 B2
(45) Date of Patent: Nov. 17, 2009

(54) METHOD, SYSTEM AND COMPUTER PROGRAM PRODUCT FOR GROUPING ITEMS IN A GROCERY STORE

(75) Inventor: Paul Tornaquindici, Portland, CT (US)

(73) Assignee: PALO Associates, LLC, Bristol, CT (US)

( * ) Notice: Subject to any disclaimer, the term of this patent is extended or adjusted under 35 U.S.C. 154(b) by 1218 days.

(21) Appl. No.: 10/613,953

(22) Filed: Jul. 3, 2003

(65) Prior Publication Data

US 2004/0010438 A1    Jan. 15, 2004

Related U.S. Application Data

(60) Provisional application No. 60/394,498, filed on Jul. 9, 2002.

(51) Int. Cl.
*G06F 17/30* (2006.01)
(52) U.S. Cl. ...................................................... 705/10
(58) Field of Classification Search ................ 705/7, 705/10
See application file for complete search history.

(56) References Cited

U.S. PATENT DOCUMENTS

| 6,170,285 | B1 * | 1/2001 | Huffman et al. ............... 62/448 |
| 6,671,578 | B1 * | 12/2003 | D'Amelio et al. ............ 700/225 |
| 2003/0014291 | A1 * | 1/2003 | Kane et al. ...................... 705/8 |
| 2003/0055707 | A1 | 3/2003 | Busche et al. ................. 705/10 |

OTHER PUBLICATIONS

Brown "Allocation of Shelf Space: A Case Study of Refrigerated Juice Products in Grocery Products", Dec. 1996, Agribusiness, vol. 12, No. 2. pp. 113-121.*
Urban "An Inventory-Theoretic Approach to Product Assortment and Shelf-Space Allocation", Dec. 1998, Journal of Retailing, vol. 74(1). pp. 1-21.*

* cited by examiner

*Primary Examiner*—Romain Jeanty
(74) *Attorney, Agent, or Firm*—Cantor Colburn LLP

(57) ABSTRACT

An embodiment of the present invention is a method for grouping items in a grocery store containing a plurality of existing products. The method comprises categorizing each existing product by type. Shelf space is assigned to each existing product. Assigning includes placing each existing product in close geographic proximity to another existing product with the same type. The shelf space in the grocery store is rearranged responsive to the assigning.

12 Claims, 5 Drawing Sheets

METHOD, SYSTEM AND COMPUTER PROGRAM PRODUCT FOR GROUPING ITEMS IN A GROCERY STORE

CROSS REFERENCE TO RELATED APPLICATIONS

This application claims the benefit of U.S. Provisional Application No. 60/394,498, filed Jul. 9, 2002.

BACKGROUND OF THE INVENTION

The present disclosure relates generally to a method for grouping items in a grocery store and in particular, to a method for grouping like items together.

Grocery stores face increasing competition from a growing number of warehouse stores, club stores, discount stores, convenience stores and restaurants. Several major discount stores, warehouse stores and club stores now carry food items. In addition, more restaurants are offering take-out menus in response to an increased demand by consumers for ready to eat meals. One way for a grocery store to remain competitive is for it to offer similar products at comparable prices. In addition, a particular grocery store can attempt to differentiate itself from the other types of establishments that offer food in an effort to increase sales and create a loyal customer base. Grocery stores can focus on the atmosphere of the store and provide eye-catching graphics and signs, bakery smells, interesting containers and shelving, attractive surroundings, music and natural lighting. This can make the grocery shopping experience more pleasant and lead to increased sales. In addition, grocery stores can create a one-stop shopping environment and include banking services, pharmaceutical services and the ability to rent movies all within the grocery store. A grocery store can also focus on convenience and speed by providing take-out meals and fast check out lanes.

Store layout is another way that a grocery store can differentiate itself. The layout can be important to customer convenience and to the profitability of the store. Some store layouts force the customer through particular aisles in order to get to the cash registers. Still other layouts try to provide a way for shoppers looking for just a few items such as milk and bread to get through the store quickly. In many grocery stores the products are placed according to the type of container the product comes in, based on the type of refrigeration required by the product and/or under a category such as baking or ethnic foods. This can cause customer confusion in determining where to locate a particular item.

SUMMARY OF THE INVENTION

An embodiment of the present invention is a method for grouping items in a grocery store containing a plurality of existing products. The method comprises categorizing each existing product by type. Shelf space is assigned to each existing product. Assigning includes placing each existing product in close geographic proximity to another existing product with the same type. The shelf space in the grocery store is rearranged responsive to the assigning.

Another embodiment of the present invention is a method for grouping items in a grocery store. The method comprises receiving a store layout including existing products from a requestor. Each existing product is categorized by type. Shelf space is assigned to each existing product. The assigning includes placing each existing product in close geographic proximity to another existing product with the same type. The store layout is updated responsive to the assigning. The store layout is transmitted to the requestor in response to the updating.

A further embodiment of the present invention is a system for grouping items in a grocery store. The system comprises a network and a user system in communication with the network. The system further comprises a host system in communication with the network. The host system includes layout application software to implement a method comprising receiving a store layout via the network from a requestor on the user system. Each existing product is categorized by type. Shelf space is assigned to each existing product. The assigning includes placing each existing product in close geographic proximity to another existing product with the same type. The store layout is updated responsive to the assigning. The store layout is transmitted via the network to the requestor in response to the updating.

A further embodiment of the present invention is a computer program product for grouping items in a grocery store. The computer program product includes a storage medium readable by a processing circuit and storing instructions for execution by the processing circuit for performing a method. The method comprises receiving a store layout including existing products from a requestor. Each existing product is categorized by type. Shelf space is assigned to each existing product. The assigning includes placing each existing product in close geographic proximity to another existing product with the same type. The store layout is updated responsive to the assigning. The store layout is transmitted to the requestor in response to the updating.

BRIEF DESCRIPTION OF THE DRAWINGS

Referring to the exemplary drawings wherein like elements are numbered alike in the several Figures.

DETAILED DESCRIPTION OF THE INVENTION

Figure 1:
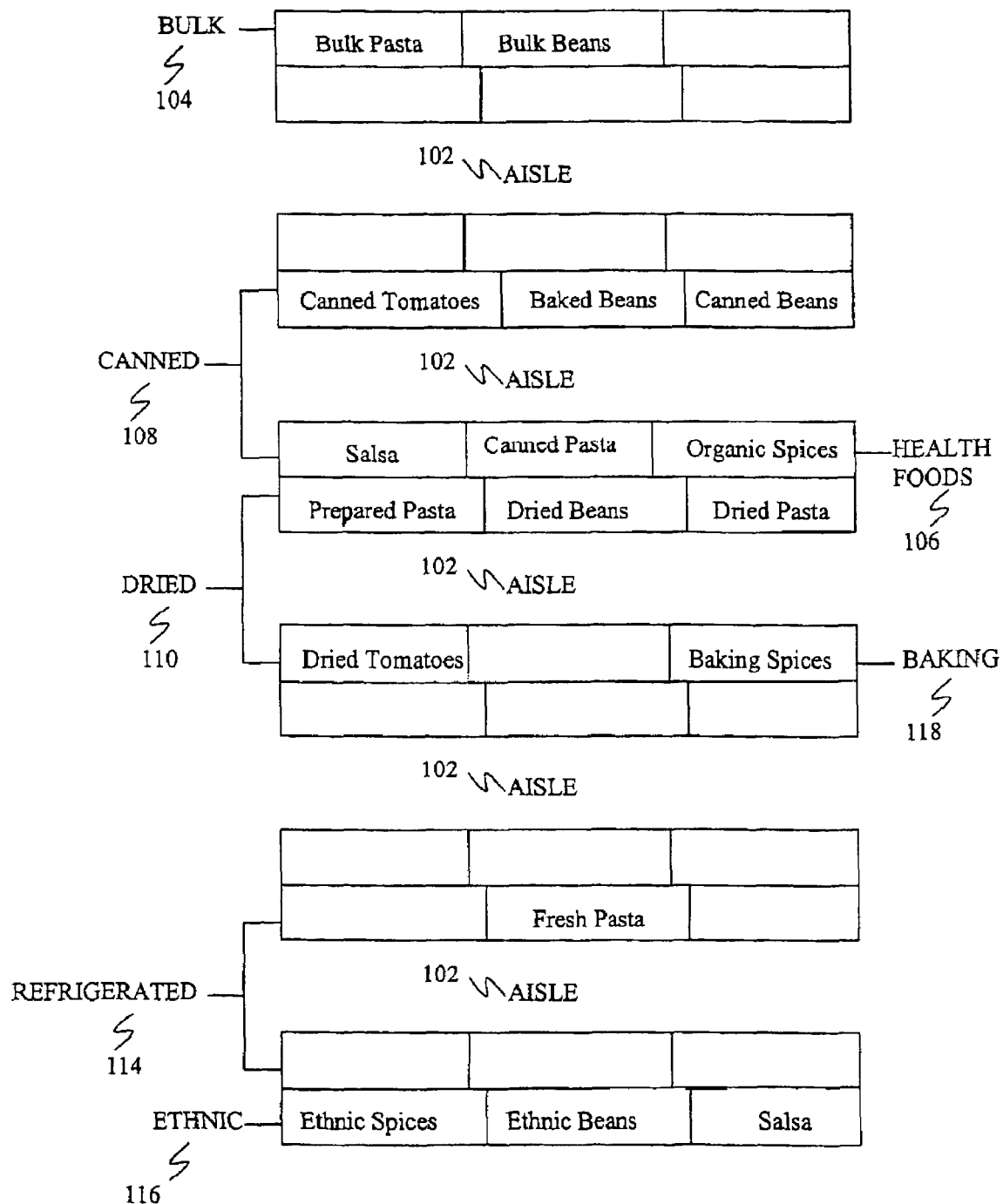
FIG. 1 is a block diagram of an exemplary grocery store layout.

The present invention brings together all the related items in a food category and merchandizes them together for the customer in one section. FIG. 1 is a block diagram of an exemplary grocery store layout. It depicts a typical method of grouping items in a grocery store where items are stored based on the type of packaging and on broad product categories such as baking items 118 and ethnic items 1 16. All the bulk items 104, such as bulk pasta and bulk beans may be stored in the same aisle 102. Canned good items 108 may be stored together and similarly for dried good items 110, refrigerated items 114, ethnic items 116 and baking items 118. In addition, sections are often created in grocery stores to feature a certain line of products.

Traditionally, and as shown in FIG. 1, items that are similar are dispersed throughout the store in many different sections. Often a product type such as spices can be found in three or more aisles. Italian spices may be located in the ethnic item 116 aisle 102, organic spices could be located in the health food item 106 aisle 102 and standard supermarket spices may be located in the baking item 118 aisle 102. Similarly, an item like pasta may be found in several places throughout the grocery store and the same item, such as salsa, may be found in two places as depicted in FIG. 1. Also, as shown in FIG. 1, pasta may be found with the bulk items 104, with the dried items 110, with the canned items 108 and in the refrigerated section 114 (e.g., fresh pasta). Having like items spread across the store can make it difficult to compare prices, compare nutritional information and to be aware of all products that are available within a food category. In addition, having like items spread across the store may cause a customer to have to backtrack through the store in an effort to find a particular product.

Figure 2:
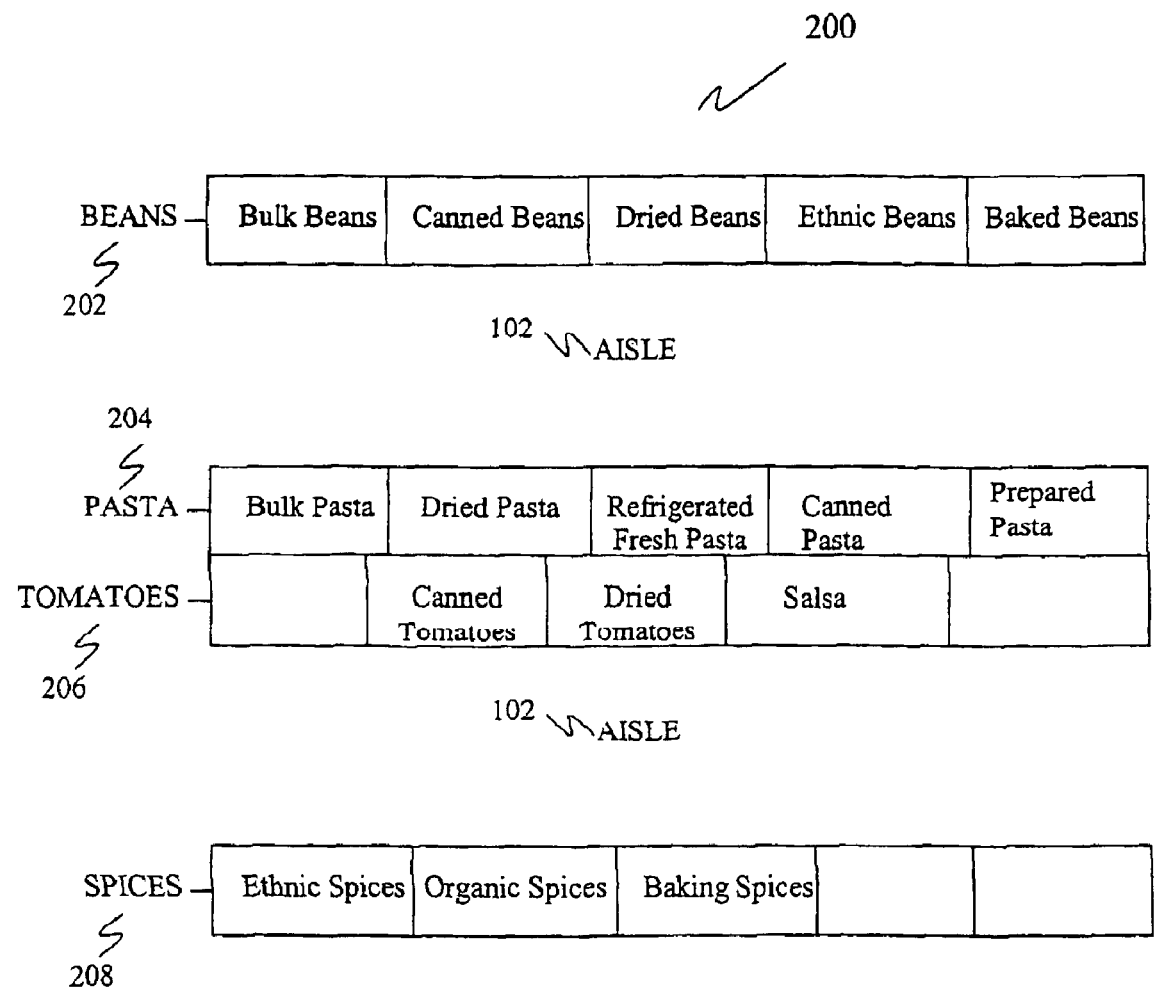
FIG. 2 is a block diagram of a grocery store layout created using an exemplary embodiment of the present invention.

FIG. 2 is a block diagram of a grocery store layout created using an exemplary embodiment of the present invention. As shown in FIG. 2, items are grouped and displayed on grocery store shelves according to food category or type. For example, all spices are gathered and presented to the customer in one place. The spice item 208 aisle 102 includes ethnic spices, organic spices and baking spices. This allows a customer access to compare, evaluate and choose from a complete presentation of the entire food category of spices. The exemplary embodiment in FIG. 2, depicts an aisle 102 that includes all the bean items 202, another aisle 102 with all the pasta items 204, one for the tomato items 206 and another for the spice items 208. In an alternate embodiment, if a food category or type does not fill an entire aisle 102, each aisle 102 may contain several categories of items. What is important is that all the like items are grouped together in close geographic proximity so that a customer may see all the available choices in a particular category.

As shown in FIG. 2, products with different kinds of refrigeration requirements are side-by-side. For example, the pasta items 204 are all in the same aisle 102 and some require refrigerated storage and others room temperature storage. The bulk pasta, canned pasta, prepared pasta and dried pasta could require room temperature storage, with the bulk pasta being stored in large bins and the dried pasta stacked on a shelf in boxes. The fresh pasta requires refrigerator storage. Putting all the pasta items in one geographic location and in a variety of storage units allows the consumer to do comparison shopping and to view all the pasta choices that are available in one place. FIG. 2 also depicts all the bean items 202: canned beans, bulk beans, dried beans, ethnic beans and baked beans in one aisle 102. Similar to the pasta items 204, the bean items 202 are stored in a variety of storage devices depending on the particular packaging and refrigeration requirements. Like the pasta items 204, the tomato items 206 are all stored in one aisle 102, and the aisle includes canned tomatoes, dried tomatoes and salsa.

Figure 3:
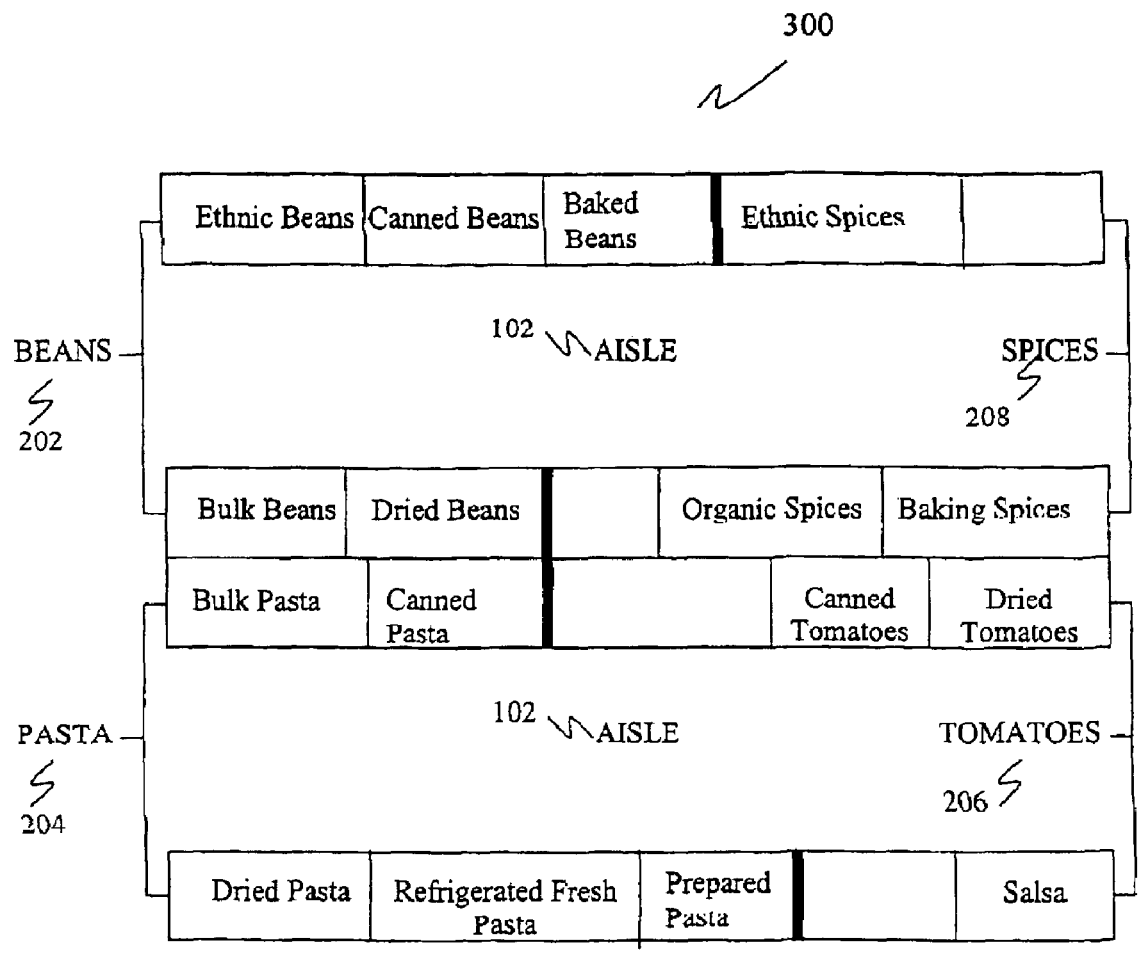
FIG. 3 is a block diagram of a grocery store layout created using an exemplary embodiment of the present invention.

FIG. 3 is a block diagram of a grocery store layout created using an alternate exemplary embodiment of the present invention. In FIG. 3, like items are stored on both sides of an aisle 102 in close geographic proximity. The bean items 202 are stored on both side of the aisle 102, with the canned beans, baked beans and ethnic beans on one side of the aisle 102 and the bulk beans and dried beans directly across the aisle 102. Similarly, FIG. 3 depicts the spice items 208 including ethnic spices, organic spices and baking spices on both sides of the aisle 102 directly across from each other. FIG. 3 also shows a layout where the tomato items 206, including canned tomatoes, dried tomatoes and salsa are stored in close proximity to each other and the pasta items 204, including bulk pasta, canned pasta, dried pasta, fresh pasta and prepared pasta are also stored in close proximity to each other. The types of food items or categories described above are for example purposes only. A particular grocery store could have its own categories for grocery items and could carry different items than those used in the examples depicted in FIGS. 1, 2 and 3. In addition, sections of shelves could be used for categories or types of food products that contain only a few selections.

Alternate exemplary embodiments include further integration of the room temperature, frozen, refrigerated and heated foods. For example, the pasta items 204 aisle 102 depicted in FIGS. 2 and 3 could also include frozen pasta items and heated pasta items (e.g., meals for take out). Alternate embodiments also include further integration of the produce items (e.g., fresh tomatoes and fresh spices) within the categories depicted in FIGS. 2 and 3. For example, the tomato items 206 aisle 102 depicted in FIGS. 2 and 3 could also include fresh tomatoes and the spice items 208 aisle 102 could also include fresh spices.

Figure 4:
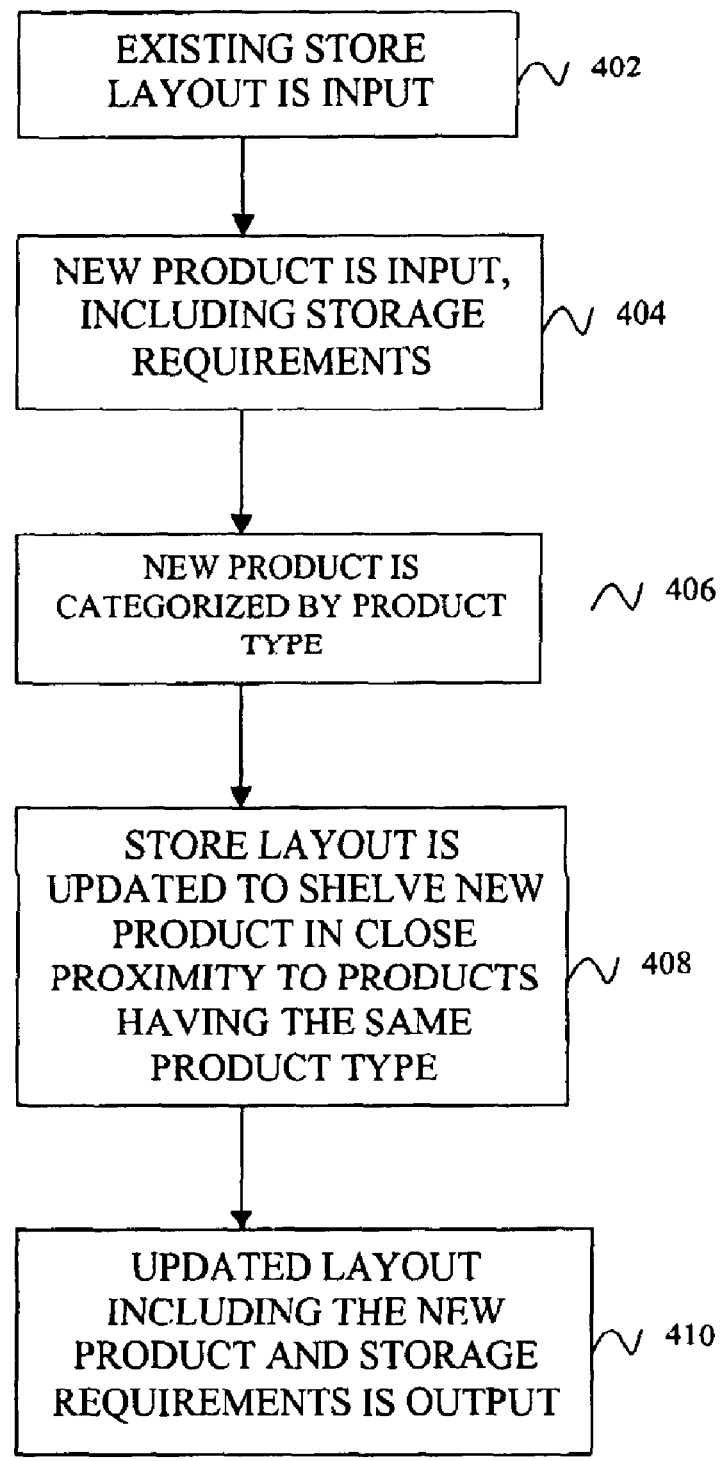
FIG. 4 is a process flow for a layout application that may be utilized in an exemplary embodiment of the present invention.

FIG. 4 is a process flow for a grocery store layout application that may be utilized in an exemplary embodiment of the present invention. At step 402, an existing store layout is input to the grocery store layout application. The existing store layout includes product types associated with each product, where products with the same product types are shelved in close geographic proximity to each other regardless of storage unit requirements. At step 404, a new product is input to the layout application. The new product data includes the storage unit requirements of the product (e.g., room temperature, refrigerated, frozen, heated). At step 406, the new product is categorized by product type. The layout application includes existing product types (e.g., beans, pasta, tomatoes, spices) and additional product types may be added if the new product does not fit into one of the existing product types. The store layout is updated at step 408 in order to shelve the new product in close geographic proximity to products having the same product type. At step 410, the updated layout, including the new product and the associated storage requirements is output to the user. The user then may physically change the layout of the grocery store based on data in the store layout output at step 410.

Figure 5:
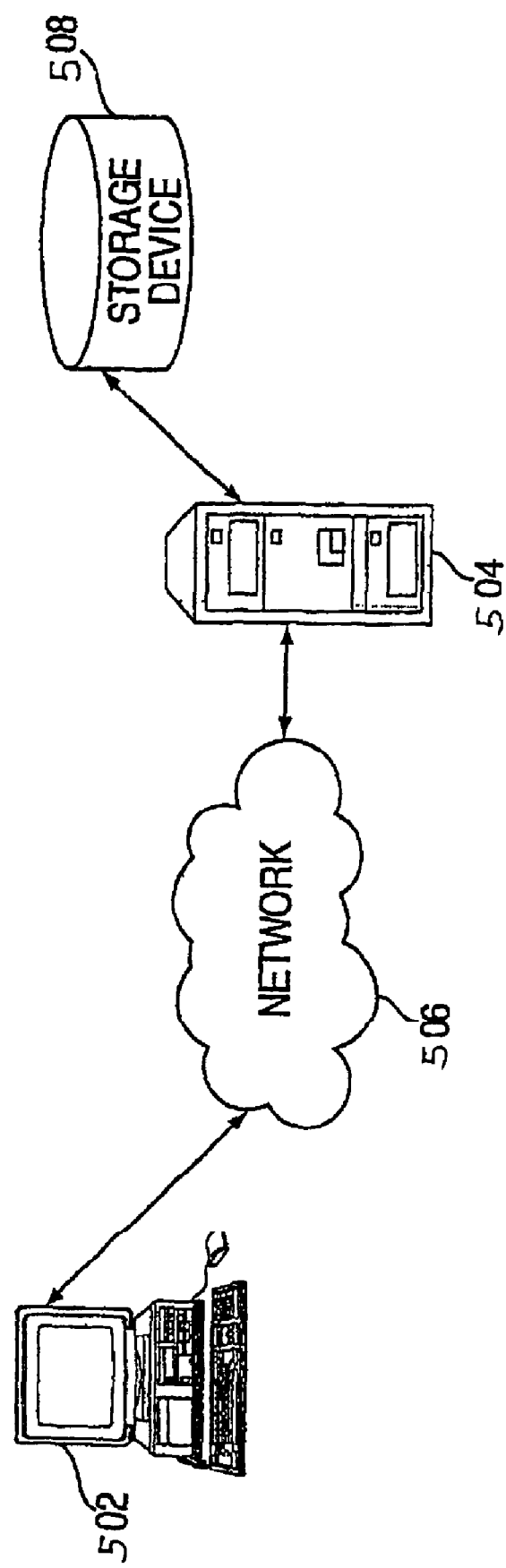
FIG. 5 is a block diagram of an exemplary system for grouping food items in a grocery store.

FIG. 5 is a block diagram of an exemplary system for grouping items in a grocery store. The system of FIG. 5 includes a user system 502 through which a user may execute a layout application to group items in a grocery store. Additionally, a request for running the layout application to group items in a grocery may come from a user, or requestor, logged on to the host system 504. In an exemplary embodiment of the present invention, the host system 504 executes an application program that creates a grocery store layout with items grouped by type. As shown in FIG. 5, the user system 502 is coupled to a host system 504 via a network 506. The user system 502 may be implemented using a general-purpose computer executing a computer program for carrying out the processes described herein. The user system 502 may be a personal computer or a host attached terminal. If the user system 502 is a personal computer, the processing and storage described herein may be shared by the user system 502 and the host system 504 in any manner known in the art (e.g., by providing an applet to the user system 502).

The network 506 may be any type of known network such as a local area network (LAN), a wide area network (WAN), or a global network (e.g., Internet). The user system 502 may be coupled to the host system 504 through multiple networks (e.g., intranet and Internet) so that it is not necessary for all user systems 502 to be coupled to the host system 504 through the same network. The user system 502 and the host system 504 may be connected to the network 506 in a wireless fashion and the network 506 may be a wireless network. In an exemplary embodiment of the present invention, the user system 502 executes a user interface application (e.g., web browser) to contact the host system 504 through the network 506. Alternatively, the user system 502 may be implemented using a device programmed primarily for accessing the network 506 such as WebTV.

The host system 504 may be implemented using a server operating in response to a computer program stored in a storage medium accessible by the server. The host system 504 may operate as a network server (often referred to as a web server) to communicate with the user system 502. The host system 504 can handle sending and receiving information to and from the user system 502 and can perform associated tasks. The host system 504 may also include a firewall to prevent unauthorized access to the host system 504 and enforce any limitations on authorized access. For instance, an administrator may have access to the entire system and have authority to modify portions of the system. The firewall may be implemented using conventional hardware and/or software as is known in the art.

The host system 504 also operates as an application server. The host system 504 executes one or more computer programs to create a layout to group food items in a grocery store. The layout application may include having a user, through a user system 502, input the current layout. Similarly, the user may enter the current shelving capacity, including the types of storage units available (room temperature, refrigerated, freezer, heated) and the storage unit capacities. In addition, preferred types or categories for grouping products, as well as the amount of each product expected to be on-hand may be entered. All data may be entered through a keyboard on the user system 502 or by importing files from other computer applications and storing them on the storage device 508. In response to receiving this data, the layout application will create a suggested store layout, including product placement and storage units required, with items grouped based on product type or category. The layout created by the layout application may be modified by the user from the user system 502. Processing may be shared by the user system 502 and the host system 504 by providing an application (e.g., java applet) to the user system 502. Alternatively, the user system 502 may include a stand-alone software application for performing a portion of the processing described herein. It is understood that separate servers may be used to implement the network server functions and the applications server functions. Alternatively, the network server, firewall and the applications server can be implemented by a single server executing computer programs to perform the requisite functions.

The storage device 508 may be implemented using a variety of devices for storing electronic information such as a file transfer protocol (FTP) server. It is understood that the storage device 508 may be implemented using memory contained in the host system 504 or the user system 502 or it may be a separate physical device. The storage device 508 contains a variety of information including store layout files, and type or category preference data. The host system 504 may also operate as a database server and coordinate access to application data including data stored on the storage device 508.

An embodiment of the present invention allows all products of a particular type to be grouped together in a grocery store aisle regardless of the type of storage required by the products. This allows a customer of the grocery store to more easily view all selections belonging to a particular product type, or category. This may allow the customer to comparison shop (e.g., price, nutrition labels) more easily and lead to increased sales due to a higher level of customer satisfaction.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for grouping food items by food product type in a grocery store, the method comprising:
receiving a store layout including existing food products from a requestor;
categorizing said existing food products by food product type, resulting in at least two categories of a first food product type and a second food product type;
assigning shelf space to said existing food products by food product type, wherein said assigning comprises:
placing a first combination of packaging types of said existing food products on a first aisle of said grocery store, said first combination of packaging types comprising: dried, canned, and bulk food items of said first food product type; and
placing a second combination of packaging types of said existing food products on a second aisle of said grocery store, said second combination of packaging types comprising: dried, canned, and bulk food items of said second food product type, thereby enhancing grocery shopping experience by enabling customers to quickly locate said existing food products of said first and second food product types regardless of said packaging types;
updating said store layout responsive to said assigning; and
transmitting said store layout to said requestor in response to said updating.

2. The method of claim 1 wherein said first combination of packaging types further comprises one or more of: refrigerated, frozen, and heated food items of said first food product type; and further wherein said shelf space includes one or more of: a refrigeration unit, a room temperature unit, a freezer unit and a heating unit, to accommodate different temperature requirements for said first food product type on said first aisle of said grocery store.

3. The method of claim 1 wherein said method further comprises:
- receiving a new food product;
- categorizing said new food product by said food product type; and
- assigning shelf space to said new food product, wherein said assigning shelf space to said new food product includes placing said new food product on one of said first and second aisles containing said existing food products with the same food product type.

4. The method of claim 1 wherein said categorizing results in a third food product type, and said assigning places a combination of ethnic, organic, and baking food items of said third food product type on a common aisle of said grocery store.

5. A system for grouping food items by food product type a grocery store, the system comprising:
- a network;
- a user system in communication with said network; and
- a host system in communication with said network, said host system including layout application software to implement a method comprising:
  - receiving a store layout including existing food products from a requestor located on a user system, said receiving via said network;
  - categorizing said existing food products by food product type, resulting in at least two categories of a first food product type and a second food product type;
  - assigning shelf space to said existing food products by food product type, wherein said assigning comprises:
    - placing a first combination of packaging types of said existing food products on a first aisle of said grocery store, said first combination of packaging types comprising: dried, canned, and bulk food items of said first food product type; and
    - placing a second combination of packaging types of said existing food products on a second aisle of said grocery store, said second combination of packaging types comprising: dried, canned, and bulk food items of said second food product type, thereby enhancing grocery shopping experience by enabling customers to quickly locate said existing food products of said first and second food product types regardless of said packaging types;
  - updating said store layout responsive to said assigning; and
  - transmitting said store layout via said network to said requestor in response to said updating.

6. The system of claim 5 further comprising a storage device in communication with said network wherein said store layout is located on said storage device.

7. The system of claim 5 wherein said network is the Internet.

8. The system of claim 5 wherein said network in an intranet.

9. The system of claim 5 wherein said user system is located in the same geographic location as said host system.

10. The system of claim 9 wherein said user system and said host system communicate directly.

11. The system of claim 5 wherein said user system is located in a different geographic location than said host system.

12. A computer program product for grouping food items by food product type in a grocery store, the computer program product comprising:
- a storage medium readable by a processing circuit and storing instructions for execution by the processing circuit for performing a method comprising:
  - receiving a store layout including existing food products from a requestor;
  - categorizing said existing food products by food product type, resulting in at least two categories of a first food product type and a second food product type;
  - assigning shelf space to said existing food products by food product type, wherein said assigning comprises:
    - placing a first combination of packaging types of said existing food products on a first aisle of said grocery store, said first combination of packaging types comprising: dried, canned, and bulk food items of said first food product type; and
    - placing a second combination of packaging types of said existing food products on a second aisle of said grocery store, said second combination of packaging types comprising: dried, canned, and bulk food items of said second food product type, thereby enhancing grocery shopping experience by enabling customers to quickly locate said existing food products of said first and second food product types regardless of said packaging types;
  - updating said store layout responsive to said assigning; and
  - transmitting said store layout to said requestor in response to said updating.

* * * * *